(12) United States Patent
Losiriwat et al.

(10) Patent No.: US 12,012,692 B2
(45) Date of Patent: Jun. 18, 2024

(54) WATERBORNE SIZING COMPOSITION FOR TREATING NATURAL FIBERS AND A PROCESS TO TREAT NATURAL FIBERS BY SAID COMPOSITION

(71) Applicant: PTT Global Chemical Public Company Limited, Bangkok (TH)

(72) Inventors: Takul Losiriwat, Bangkok (TH); Anucha Euapermkiati, Bangkok (TH)

(73) Assignee: PTT Global Chemical Public Company Limited, Chatuchak Bangkok (TH)

( * ) Notice: Subject to any disclaimer, the term of this patent is extended or adjusted under 35 U.S.C. 154(b) by 791 days.

(21) Appl. No.: 16/973,018

(22) PCT Filed: Jun. 7, 2019

(86) PCT No.: PCT/TH2019/000018
§ 371 (c)(1),
(2) Date: Dec. 7, 2020

(87) PCT Pub. No.: WO2019/240672
PCT Pub. Date: Dec. 19, 2019

(65) Prior Publication Data
US 2021/0246607 A1    Aug. 12, 2021

(30) Foreign Application Priority Data

Jun. 11, 2018 (TH) .................................. 1801003425

(51) Int. Cl.
| | |
|---|---|
| *D06M 13/50* | (2006.01) |
| *C08J 5/04* | (2006.01) |
| *C08J 5/06* | (2006.01) |
| *C08J 5/10* | (2006.01) |
| *C08K 5/00* | (2006.01) |
| *C08K 5/07* | (2006.01) |
| *D06M 13/123* | (2006.01) |
| *D06M 16/00* | (2006.01) |
| *D06M 101/06* | (2006.01) |

(52) U.S. Cl.
CPC ............ *D06M 13/123* (2013.01); *C08J 5/045* (2013.01); *C08J 5/06* (2013.01); *C08J 5/10* (2013.01); *C08K 5/0058* (2013.01); *C08K 5/0091* (2013.01); *C08K 5/07* (2013.01); *D06M 13/50* (2013.01); *D06M 16/00* (2013.01); *C08J 2453/00* (2013.01); *D06M 2101/06* (2013.01)

(58) Field of Classification Search
CPC .. D06M 13/123; D06M 13/50; C08K 5/0091; C08K 5/07
See application file for complete search history.

(56) References Cited

U.S. PATENT DOCUMENTS

| | | | |
|---|---|---|---|
| 4,461,858 A | 7/1984 | Adelman | |
| 4,537,807 A * | 8/1985 | Chan | ..................... D21H 17/36 206/812 |

FOREIGN PATENT DOCUMENTS

| | | |
|---|---|---|
| WO | 2014/190097 A1 | 11/2014 |
| WO | 2017/094812 A1 | 6/2017 |
| WO | 2018/019735 A1 | 2/2018 |

OTHER PUBLICATIONS

International Search Report & Written Opinion from corresponding International Application No. PCT/TH2019/000018 dated Apr. 16, 2020.

* cited by examiner

*Primary Examiner* — Sikarl A Witherspoon
(74) *Attorney, Agent, or Firm* — TROUTMAN PEPPER HAMILTON SANDERS LLP

(57) ABSTRACT

The present invention relates to a waterborne sizing composition for treating natural fibers to be used as reinforcing material in thermoplastic, comprising: (a) a polymeric material having structure (I) wherein, R represents an alkyl group, X represents a reversible covalently bonded cross-linkable group, p, q, and r represent order on a main polymer chain, wherein the total sum of order greater than 50; (b) a water-soluble metal complex having an antimicrobial property; and (c) a redox active water-soluble compound.

9 Claims, 1 Drawing Sheet

WATERBORNE SIZING COMPOSITION FOR TREATING NATURAL FIBERS AND A PROCESS TO TREAT NATURAL FIBERS BY SAID COMPOSITION

FIELD OF THE INVENTION

The present invention relates to a waterborne sizing composition for treating natural fibers and a process to treat natural fibers by said composition

BACKGROUND OF THE INVENTION

The natural fibers reinforced thermoplastic composite has gained more interests in its applications in various industries because said material is lighter than other fibers such as glass fibers or carbon fibers. Moreover, said material has advantages in its biologically reproducible property, which is one of the ways to reduce the releasing of greenhouse gas to the atmosphere.

Although the use of the reinforcing material with natural fibers has the above advantages, the use of said material has several limitations such as the low compatibility of natural fibers and polymer matrix resulting in the separation of the workpiece, the mechanical degradation when used because of the microbial in fibers cellulosic composition including the fluffiness of the fiber because of the low total density (about 0.09-0.1 g/cm$^3$), which gives difficulty to the large production of fibers to be reinforcing material in industrial scale.

The natural fibers are mainly composed of the cellulosic component which comprises the high polar hydroxyl group as the main component, wherein the thermoplastic matrix material in the production process has clearly lower polar than the fibers, especially the polyester group or the non-polar group such as polyethylene or polypropylene. The polarity different of said materials has negative effect on the surface bonding between the natural fibers and the polymer matrix which directly results in the mechanical properties such as the tensile strength and the flexural strength.

Generally, the compatibilizer is used in order to overcome said problems during the pellet cutting. The said compatibilizer has a functional chemical group that can react with the hydroxyl group. The most popular compatibilizer being used is maleic anhydride-grafted polypropylene (MAPP) as disclosed in WO2009139508A1, WO1996005347A1, U.S. Pat. No. 7,781,500B2 and in research paper, for example, Keener T J, (2004) Compos A: Appl Sci Manuf, Cantero G (2003). Compos Sci Technol, and Joseph P V, (2003) Compos A: Appl Sci Manuf, etc.

U.S. Pat. No. 7,879,925B2 discloses the method for adding the compatibilizer comprising epoxide groups. However, the above-mentioned method could only solve the interaction problem between fibers and matrix, but does not help in the bonding between minor fibers agglomerated into bunch of fibers, which are natural characters of these fibers. Another problem was the distribution of compatibilizer in the matrix without direct contact with the fibers.

U.S. Pat. No. 6,939,903B2 and research document Agrawal R, (2000). Mater Sci Eng: A disclose other methods for improving fibers by employing the organic xylan derivative. CN100487060C and research document Paul A (1997) Compos Sci Technol and Sreekala M S (2003) Compos Sci Technol disclose the methods for improving fibers by employing the isocyanate. However, these methods employed high reactivity substances resulting in the production processes dangerous.

It is well known that the cellulosic fibers can be digested by the microbial in both bacteria and fungi which affects the mechanical properties of the reinforcing materials when time pass. U.S. Pat. No. 8,338,514B2 discloses the digestion process by microbial of cellulosic fibers by adding the anti-microbial masterbatch during the production of plastic pellets. The said substance usually had a problem in the distribution of the active compound because said anti-microbial usually distributed in the polymer matrix but does not bonded to the cellulose in the fibers which were the degraded parts.

U.S. Pat. No. 8,183,167B1 and U.S. Pat. No. 8,834,917B2 disclose the use of insoluble copper, silver particle, and transition metal ion such as copper (II) naphthenate or zinc (II) chloride for maintaining the natural materials. But said method was multi-steps method comprising the immersion of fibers in copper (II) or silver salt solution followed by drying and second immersion in reducing solution such as ascorbic acid or sodium borohydride. Said process also may be limit when the coating is required in the next step because the particles bonded on the fibers might be attached to the coating substance. Moreover, there was also problem when adding anti-microbial particles into the coating solution because said particles agglomerated and precipitated which was not suitable for using in the industrial scale.

The carbon fibers and glass fibers used as reinforcing materials are always coated at their surfaces by the coating solutions such as organic xylan, acrylate, epoxy, or urethane. To increase the flowability of the materials during the production process of the reinforcing pellet, the natural fibers have very low total density (approximately 0.08 g/cm$^3$) and have fluffy appearances which were obstacles to the use in the production of the reinforcing materials with general tools. In order to overcome these problems, the studies in the immerse coating of the natural fibers with poly(vinyl alcohol) as disclosed in Nam, G (2014) Effect of Natural Fiber Reinforced Polypropylene Composite Using Resin Impregnation. Agricultural Sciences and U.S. Pat. No. 8,419,991B2 disclose the use of sizing agent comprising cellulosic derivative, starch derivatives or poly(vinyl alcohol) or poly(vinyl acetate). However, the starch derivative and cellulosic derivative are highly hydrophilic in which said property increases the water absorption rate of the materials which affects the degradation from microbial of the materials. Moreover, the high polarity property decreases the compatibility with the polymer matrix. In another case, poly(vinyl acetate) can dissolve out of the fiber surface into the polymer matrix during the production process. This results in the decreasing of the interaction of fibers and polymer matrix.

From all problems stated above, this invention aims to develop the waterborne sizing composition for treating natural fibers in order to improve properties of the obtained fiber to be compatible with the polymer matrix, increasing the anti-microbial property, and improving the processability of the obtained fibers by increasing their bulk density and flowability.

Moreover, the invention also discloses the preparation process for the natural fibers by said waterborne sizing composition. Said process can be easily performed, reducing elution problem, reducing fibers agglomeration, and precipitation of the antimicrobial particles.

SUMMARY OF THE INVENTION

The present invention relates to a waterborne sizing composition for applying to the natural fibers, in which the natural fibers obtained from the treatment process according to this invention can be applied as the reinforced materials providing a good compatible between fibers and polymer matrix, resulting an antimicrobial synergistic effect, and reducing an industrial scale production problem, wherein said composition comprising:

(a) a polymeric material having structure (I)

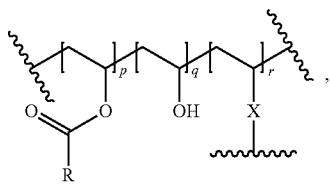

(I)

wherein,

R represents an alkyl group,

X represents a reversible covalently bonded crosslinkable group, p, q, and r represent order on a main polymer chain, wherein the total sum of order greater than 50;

(b) a water-soluble metal complex having an antimicrobial property; and (c) a redox active water-soluble compound.

In one embodiment, this invention relates to the preparation process of natural fibers from said composition. Said process can be easily performed, reducing elution problem, fibers agglomeration, and reducing precipitation of the antimicrobial particles.

DESCRIPTION OF THE INVENTION

Figure 1A:
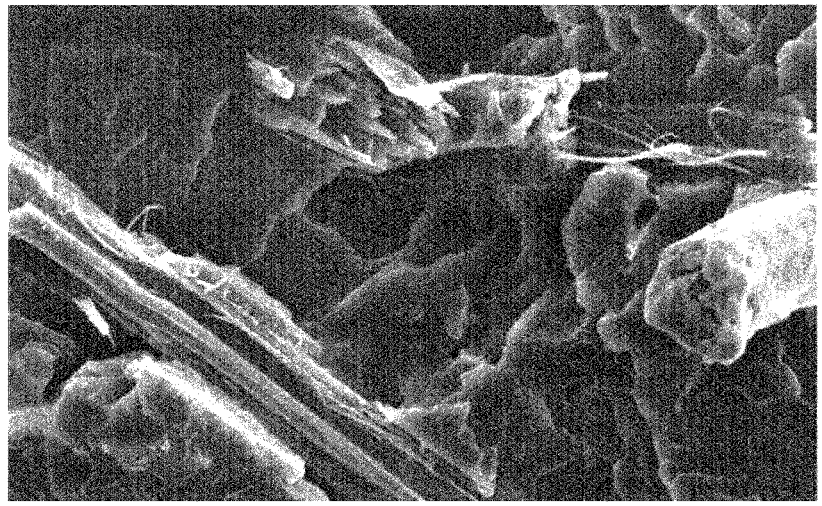
FIGS. 1(a) and 1(b) show[[s]] the surface analysis of fibers using the scanning electron microscope, wherein:
(1a) Fibers coated with the waterborne sizing composition according to this invention; and
(1b) Fibers coated with the sizing composition comprising polyvinyl acetate polymer material.

Technical terms or scientific terms used herein have definitions as by a person skilled in the art unless stated otherwise.

Any tools, equipment, methods, or chemicals named herein mean tools, equipment, methods, or chemicals being used commonly by a person skilled in the art unless stated otherwise that they are tools, equipment, methods, or chemicals specific only in this invention.

Use of singular noun or singular pronoun with "comprising" in claims or specification means "one" and including "one or more", "at least one", and "one or more than one".

Throughout this application, term "about" means any number that appeared or showed herein that could be varied or deviated from any error of equipment, method, or personal using said equipment or method, including variations or deviations occurred from the physical condition such as molecular weight of polymers.

Hereafter, invention embodiments are shown without any purpose to limit any scope of the invention.

This invention discloses the waterborne sizing composition for treating natural fibers to be used as reinforcing material in thermoplastic, comprising:

(a) a polymeric material having structure (I)

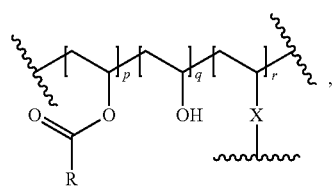

(I)

wherein,

R represents an alkyl group,

X represents a reversible covalently bonded crosslinkable group, p, q, and r represent order on a main polymer chain, wherein the total sum of order is more than 50;

(b) a water-soluble metal complex having an antimicrobial property; and (c) a redox active water-soluble compound.

In one embodiment, R represents the alkyl group that is selected from a linear alkyl group, a branched alkyl group, or a cyclic alkyl group, preferably the linear alkyl group, and most preferably the methyl group or propyl group.

In one embodiment, X represents the reversible covalently bonded crosslinkable group in which the crosslinked is bonded with the other polymers or the cellulosic composition within the fibers. This has an important role in the compatibility of surfaces and the prevention of the dissolving of the sizing composition into the polymer matrix during the forming process by forming strong covalent bonds between the sizing composition and the natural fibers. Preferably, X is obtained from the mixture of boric acid and dialdehydes.

In one embodiment, the ratio of boric acid to dialdehydes is in a range of 1:2-1:4 based on the mole basis.

In one embodiment, the dialdehydes are aliphatic dialdehydes that selected from glyoxal, succinaldehyde, glutaraldehyde, or a mixture thereof.

In one embodiment, the total sum of p, q, and r orders is more than 100. Preferably, the percentage of p order is 70-90%, q order 10-30%, and r order 0.02-1.25% based on 100% of the total sum of p, q, and r orders.

The p, q, and r orders give random polymer of compositions of vinyl alkanoate units, vinyl alcohol units, and the trans vinyl group, wherein the ratio of p, q, and r is important to the properties of the desired waterborne sizing composition. The high p value gives good compatibility to the polymer matrix but also causes the detachment of the sizing composition. The high q value gives good compatibility to the natural fibers phase but also increases the undesirable water absorption. The r value increases the bonding strength between the sizing composition and the natural fibers, but too high value causes the agar-link texture and the agglomeration of the sizing composition.

In one embodiment, the water-soluble metal complex is the complex of metal and ligands in which said complex has an anti-microbial property, preferably the copper complexes or the silver complexes.

In one embodiment, the ligand of the water-soluble metal complex is selected from polyamines or aminocarboxylates.

In one embodiment, the redox active water-soluble compound is selected from aldohexoses, aldopentoses, or a mixture thereof.

In one embodiment, the polymeric material comprises from 7 to 15 weight by volume percentage (% w/v); the water-soluble metal complex from 50-750 parts per million (ppm); and the redox active water-soluble compound from 100-1500 parts per million (ppm).

In one embodiment, this invention relates to the preparation process of natural fibers to be used as reinforcing material in thermoplastic, comprising the following steps:
(1) coating the natural fibers with the waterborne sizing composition as stated above; and
(2) drying the natural fibers obtained from (1) by heating and cutting into suitable sizes for using.

In one embodiment, the coating of the natural fibers in step (1) is performed by immersing the natural fibers in said waterborne sizing composition at the temperature lower than 50° C., preferably at the ambient temperature.

In one embodiment, the drying by heating in step (2) is operated at the temperature higher than or equal to 80° C., preferably in a range of 80 to 140° C., in order to release the metal complex and provide the anti-microbial particle. Moreover, this causes the decomposition of the metal complex and reaction with the redox active compound.

In one embodiment, the natural fibers may be conveyed by the fibers conveying and roller system to immerse the natural fibers into the waterborne sizing composition completely. Then, the fibers may be pressed by roller system and fixed to drain the excess liquid.

In one embodiment, after the natural fibers had been dried, they will be conveyed to be cut by the automatic cutting machine to produce cut fibers for the production of the reinforcing materials. The preferable length of the cut fibers is in a range of 1 to 3.5 mm to make sure that they can be used with general material feeder without sticking in the machine.

In one embodiment, the natural fibers for producing cellulosic fibers are raw fibers or treated fibers.

In one embodiment, the natural fibers for producing cellulosic fibers from plants includes but not limited to cotton, linen, hemp, jute, pineapple fibers, bamboo fibers, and coconut fibers, preferable are kenaf, jute, hemp, or mixture thereof.

In one embodiment, the natural fibers may be subjected to immerse in alkaline solution in order to remove contaminants such as lignin and some hemicellulose from the fibers.

In one embodiment, the natural fibers obtained from the processes according to this invention can be applied as the reinforcing materials in polyolefin in composites materials.

In one embodiment, polyolefin is selected from polyethylene, polypropylene, copolymers thereof, or mixture thereof.

In one embodiment, the composite materials obtained from reinforcing with the natural fibers from this invention can be applied to the industrial in order to produce workpiece formed from composite pellet comprising the reinforcing material obtained from the present invention, including but not limited to vehicle parts in vehicle industry, airplane parts, ship parts, water pipe, bucket, goods supporter, electric appliance parts, and car parts.

The following example is only for demonstrating the embodiments of this invention, not for limiting the scope of this invention in any way.

Stability Testing of the Water-Soluble Metal Complex in the Waterborne Emulsion Sizing Composition To test a stability of the water-soluble metal complex in the waterborne emulsion sizing composition, said waterborne emulsion sizing composition comprises the metal complex having an antimicrobial property according to the invention and the comparative samples were studies as the followings.

The mixture containing the following ingredients was stirred.
12% w/v of the polymer according to structure (I) obtained from mixture of polyvinyl acetate and polyvinyl alcohol copolymers, boric acid, and glyoxal to provide p about 75%, q about 24%, and r about 1% based on 100% of total sum of p, q, and r.
300 ppm of the metal complex or the metal complex having anti-microbial property as shown in table 1.

Then the mixture was kept in the closed container for 2 months for testing a stability. The results were shown in table 1.

TABLE 1

Results of the stability testing of the metal complex or the metal complex having an anti-microbial property

| Sample | Metal complex or the metal complex having an anti-microbial property | Results of the stability testing |
| --- | --- | --- |
| Sample according to the invention | Silver (I) polyamine complex Copper (II) polyamine complex Copper (II) aminocarboxylate complex | No precipitate no change in colour or viscosity |
| Comparative sample | Silver nitrate Copper(II) chloride Copper (II) sulphate | More intensity of colour when time pass |

Effect of the Waterborne Sizing Composition According to the Invention to the Physical Properties of the Natural Fibers The alkaline metal treated kenaf was immersed into the waterborne sizing composition according to the invention comprising 12% w/v of polymer material having structure (I) prepared by the details as described above, 250 ppm silver (I) polyamide complex, and 500 ppm aldohexose. Then, the obtained fibers were dried and cut into about 2 mm long.

It was found that the obtained fibers had a good flowability and had the bulk density value about 0.14 g/cm$^3$, which was better than the fibers without the sizing composition according to the invention, which had low flowability and the bulk density value about 0.09 g/cm$^3$.

Compatibility Testing of the Fibers Subjected to the Coating Process and Polyolefin To test the compatibility of the fibers subjected to the coating process with the waterborne sizing composition according to the invention and polyolefin. The composite material of fibers and polypropylene-polyethylene blocked copolymers prepared by the following details were used as samples in the said study.

The polypropylene-polyethylene blocked copolymers were mixed with the fibers subjected to the coating process with the waterborne sizing composition according to the invention as described above, wherein the amount of the fibers was about 30% by weight were mixed in brabender at the temperature about 190° C. for 5 min. The obtained composite was analyzed by the scanning electron microscope (SEM). The results were shown in FIG. 1.

Figure 1B:
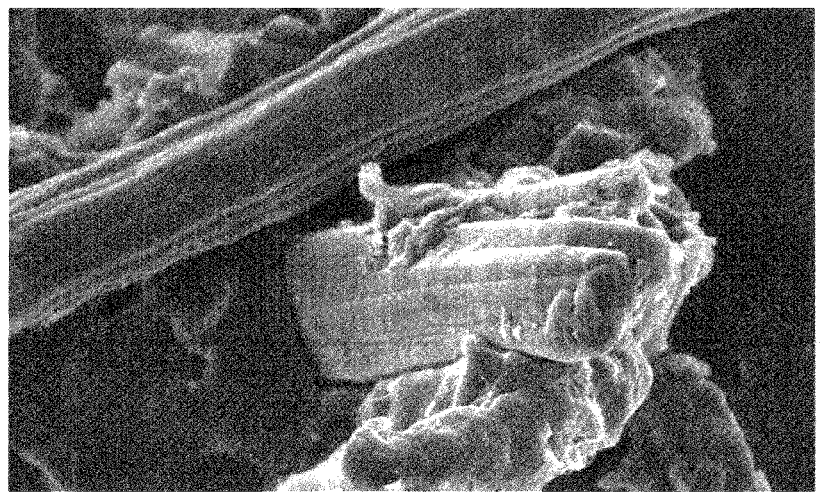

FIG. 1(a) shows the photo analyzed by the scanning electron microscope of the fibers subjected to the coating process with the waterborne sizing composition according to the invention, whereas FIG. 1(b) shows the photo analyzed by the scanning electron microscope of the fibers subjected to the coating process with polymer material which was polyvinyl acetate.

From FIGS. 1(a) and 1(b), it was found that sample subjected to the waterborne sizing composition according to the invention gave good surface interaction without detachment of the sizing composition from the fibers obtained from the coating according to this invention.

Mechanical Properties Testing of the Composite Materials Comprising the Natural Fibers Subjected to the Coating Process with the Waterborne Sizing Composition According to the Invention To test the mechanical properties of composite materials, polypropylene copolymers and polypropylene polymer were mixed with the natural fibers subjected to the coating process with the waterborne sizing composition according to the invention by the following preparation method of the composite materials.

The polypropylene copolymers or polypropylene polymer master batch containing 4 parts per hundred (phr) was mixed by the twin screws extruder, in which the natural fibers subjected to the coating process with the waterborne sizing composition according to the invention described above was fed via internal feeder at 10%, 20%, and 30% by weight of the composite materials. The plastic pellets obtained from the twin screws extruder were subjected to the injection molding to test these samples. Results are shown in table 2 and table 3.

The following are testing examples of several properties of the prepared samples from above methods, wherein methods and instruments employed for testing are methods and instruments being used generally, and not intended to limit the scope of the invention.

Tensile Strength and Tensile Modulus Testing

The tensile strength and tensile modulus were tested by Instron Instrument model 5567 using samples formed a dog bone shape having 3 mm thick prior to the ASTM D638 standard testing at the rate about 50 mm/min. The gauge length was about 25 mm.

Flexural Strength and Flexural Modulus Testing

The flexural strength and flexural modulus were tested by Instron Instrument model 2810. The four points testing was used to evaluate rigid and semi-rigid materials according to the ASTM D790 standard. The samples were subjected to the injection molding to be a specimen having 3 mm thick, 10 mm wide, and the pressing length of 64 mm.

Heat Deflection Temperature Testing

The heat deflection temperature was tested by Instron Instrument model ISO306. The specimen was formed by the injection molding to a specimen having 12.7 mm wide, 120 mm long, and 3 mm thick. The heating temperature was tested according to the ASTM D648.

Izod Impact Resile Testing

The izod impact resile was tested by the Instron Instrument model CEAST9050. The obtained composite pellets were formed by the injection molding to a specimen having 12.7 mm wide, 63.5 mm long, and 3 mm thick. The specimen was cut into 10.16 mm ligament prior to the testing.

TABLE 2

Mechanical properties of composite materials using polypropylene copolymers as the polymer matrix

| Fibers amount (%) | Tensile strength (MPa) | Tensile modulus (MPa) | Flexural strength (MPa) | Flexural modulus (MPa) | Heat deflection temperature (° C.) | Izod impact resile (kJ/m²) |
|---|---|---|---|---|---|---|
| Based Resin | 25.0 | 1380 | 34.8 | 1370 | 90.0 | 98.3 |
| 10 | 30.1 | 1710 | 39.9 | 2020 | 124.5 | 53.1 |
| 20 | 32.4 | 2320 | 43.6 | 2610 | 142.6 | 50.9 |
| 30 | 35.9 | 3450 | 49.6 | 3640 | 150.3 | 49.6 |

TABLE 3

Mechanical properties of composite materials using polypropylene polymer as the polymer matrix

| Fibers amount (%) | Tensile strength (MPa) | Tensile modulus (MPa) | Flexural strength (MPa) | Flexural modulus (MPa) | Heat deflection temperature (° C.) | Izod impact resile (kJ/m²) |
|---|---|---|---|---|---|---|
| Based Resin | 35.3 | 1480 | 42.8 | 1570 | 94.0 | 24.8 |
| 20 | 42.5 | 2930 | 60.5 | 2750 | 145.3 | 29.9 |
| 30 | 45.1 | 3890 | 43.0 | 3540 | 153.0 | 35.2 |

From table 2 and table 3, it was found that the mechanical properties of the polypropylene copolymers and polypropylene polymer were increasing when fibers were added. When the amount of fibers mixed in plastic was increased, the tensile modulus, flexural modulus, and heat deflection temperature were significantly increased. This was caused by the natural fibers prepared from the processes according to the invention.

Preferred Embodiment of the Invention

Preferred embodiment of the invention is as provided in the description of the invention.

The invention claimed is:

1. A waterborne sizing composition for treating natural fibers used as reinforcing material in thermoplastic, comprising:

(a) a polymeric material having a structure (I)

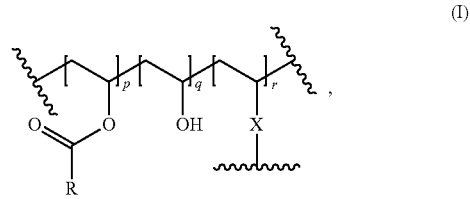

(I)

wherein,

R represents an alkyl group,

X represents a reversible covalently bonded crosslinkable group, p, q, and r represent order on main polymer chain, wherein the total sum of order is greater than 50;

(b) a water-soluble metal complex having an antimicrobial property; and (c) a redox active water-soluble compound.

2. The composition according to claim 1, wherein R is selected from a linear alkyl group, a branched alkyl group, or a cyclic alkyl group.

3. The composition according to claim 1, wherein X is a reversible covalently bonded crosslinkable group obtained from a mixture of boric acid and a dialdehydes selected from glyoxal, succinaldehyde, glutaraldehyde, or a mixture thereof.

4. The composition according to claim 1, wherein the ratio of boric acid to dialdehydes is in a range of 1:2-1:4 based on the mole basis.

5. The composition according to claim 1, wherein the total sum of p, q, and r orders is more than 100.

6. The composition according to claim 1, wherein the percentage of p order is 70-90%; q order 10-30%, and r order 0.02-1.25% based on 100% of the total sum of p, q, and r orders.

7. The composition according to claim 1, wherein the water-soluble metal complex is selected from copper complexes, silver complexes comprises ligand selected from polyamines or aminocarboxylates.

8. The composition according to claim 1, wherein the redox active water-soluble compound is selected from aldohexoses, aldopentoses, or mixture thereof.

9. The composition according to claim 1, wherein further comprises the polymeric material from 7 to 15 weight by volume percentage (% w/v), the water-soluble metal complex from 50-750 parts per million (ppm), and the redox active water-soluble compound from 100-1500 parts per million (ppm).

* * * * *